(12) United States Patent
He et al.

(10) Patent No.: US 11,310,083 B2
(45) Date of Patent: Apr. 19, 2022

(54) METHOD AND SYSTEM FOR SELECTING IMPORTANT DELAY TAPS OF CHANNEL IMPULSE RESPONSE

(71) Applicant: WUHAN UNIVERSITY, Hubei (CN)

(72) Inventors: Yigang He, Hubei (CN); Yongbo Sui, Hubei (CN); Liulu He, Hubei (CN); Chaolong Zhang, Hubei (CN)

(73) Assignee: WUHAN UNIVERSITY

( * ) Notice: Subject to any disclaimer, the term of this patent is extended or adjusted under 35 U.S.C. 154(b) by 0 days.

(21) Appl. No.: 17/163,581

(22) Filed: Feb. 1, 2021

(65) Prior Publication Data
US 2021/0314199 A1 Oct. 7, 2021

(30) Foreign Application Priority Data
Apr. 3, 2020 (CN) .......................... 202010261280.7

(51) Int. Cl.
*H04B 17/309* (2015.01)
*H04L 25/03* (2006.01)
*H04L 25/02* (2006.01)

(52) U.S. Cl.
CPC .... *H04L 25/03019* (2013.01); *H04L 25/0212* (2013.01); *H04B 17/309* (2015.01)

(58) Field of Classification Search
CPC ... H04L 5/0048; H04L 25/0212; H04L 5/001; H04L 5/0057; H04L 1/0071; H04L 25/0224; H04L 5/0007; H04L 5/0023; H04L 5/0051; H04L 5/0053; H04L 5/0094; H04L 25/0204; H04W 24/10; H04W 24/08; H04W 72/0446; H04W 72/0453; H04W 76/27; H04W 16/28; H04W 4/029; H04W 72/042; H04W 36/0058; H04W 68/005; H04W 72/0413; H04W 76/19; H04W 76/30; H04B 7/0626; H04B 7/0456; H04B 7/0617; H04B 7/0417; H04B 7/0452; H04B 7/0695; H04B 17/336; H04B 7/06;
(Continued)

(56) References Cited

U.S. PATENT DOCUMENTS 8,995,578 B2 * 3/2015 Kato ..................... H04L 25/025 375/340
2004/0247038 A1 * 12/2004 Uesugi ................ H04L 27/2647 375/260

(Continued)

*Primary Examiner* — Eva Y Puente
(74) *Attorney, Agent, or Firm* — JCIPRNET (57) ABSTRACT

A method and a system for selecting important delay taps of channel impulse response are provided, which belong to the field of adaptive transmission technology of wireless communication. The method performs local predictability estimation on all delay taps in the channel impulse response in wireless communication, thereby selecting the important delay taps in the channel impulse response. The disclosure uses recurrence rates of the delay taps to estimate local predictability of the delay taps. Noise delay taps are distinguished from the important delay taps through the local predictability of the delay taps, which improves the identification rate of the important delay taps of the channel impulse response in wireless communication. The disclosure may implement the selection of the important delay taps of the channel impulse response, which provides guarantee for implementing adaptive transmission and adaptive coding of wireless communication.

16 Claims, 4 Drawing Sheets

(58) Field of Classification Search
CPC .... H04B 17/27; H04B 17/318; H04B 17/364; H04B 7/024
USPC ........................................................ 375/229
See application file for complete search history.

(56) References Cited

U.S. PATENT DOCUMENTS

2007/0206310 A1* 9/2007 Hutchins ................ G11B 20/10
  360/65
2013/0070834 A1* 3/2013 McKown .......... H04L 25/03057
  375/232

* cited by examiner

METHOD AND SYSTEM FOR SELECTING IMPORTANT DELAY TAPS OF CHANNEL IMPULSE RESPONSE

CROSS-REFERENCE TO RELATED APPLICATION

This application claims the priority benefit of China application serial no. 202010261280.7, filed on Apr. 3, 2020. The entirety of the above-mentioned patent application is hereby incorporated by reference herein and made a part of this specification.

BACKGROUND

Technical Field

The disclosure relates to the field of adaptive transmission technology of wireless communication, and more specifically relates to a method and a system for selecting important delay taps of a channel impulse response.

Description of Related Art

With the development of science and technology, the adaptive transmission of wireless communication is the trend of future development. In the channel impulse response, important delay taps are an important part of supporting adaptive transmission technology. In the prior art, it is a relatively difficult issue to accurately identify and select important delay taps. Therefore, in order to solve the above issue, it is of great significance to provide a simple and effective method for selecting important delay taps.

SUMMARY

The disclosure provides a method and a system for selecting important delay taps of a channel impulse response, thereby solving the technical issue that it is difficult to accurately identify and select important delay taps of a channel impulse response.

To achieve the above objective, according to an aspect of the disclosure, a method for selecting important delay taps of a channel impulse response is provided, which includes the following steps.

An amplitude of each delay tap sampling point is obtained according to the channel impulse response.

An optimal delay and an optimal embedding dimension of the amplitude of each delay tap sampling point are obtained according to the amplitude of each delay tap sampling point.

A reconstructed phase space of each delay tap sampling point is obtained based on the optimal delay and the optimal embedding dimension of the amplitude of each delay tap sampling point.

A selection threshold of each delay tap sampling point is obtained according to the reconstructed phase space of each delay tap sampling point.

A threshold recurrence plot of each delay tap sampling point is obtained based on the selection threshold of each delay tap sampling point.

A recurrence rate of each delay tap sampling point is obtained based on the threshold recurrence plot of each delay tap sampling point.

Several delay taps with recurrence rate magnitudes at front are selected as the important delay taps according to the recurrence rate of each delay tap sampling point.

Preferably, a selection threshold $\theta_i$ of an i-th delay tap sampling point is obtained from $\theta_i = \lambda \sigma_i$, where $\lambda$ is the threshold coefficient, and $\sigma_i$ is the standard deviation of an amplitude of the i-th delay tap sampling point.

Preferably, a threshold recurrence plot of the i-th delay tap sampling point is obtained from $P_{a,b} = \Psi(\theta_i - D_{a,b})$, where $\Psi$ is the step function, $D_{a,b}$ is the Euclidean distance between an a-th point $\xi_a$ and a b-th point $\xi_b$ in a reconstructed phase space of the i-th delay tap sampling point, $D_{a,b} = \|\xi_a - \xi_b\|$, where $a, b = 1, 2, 3, \ldots, K_p$, $K_p = K - (d_i - 1)\tau_i$, where K is the total number of pilots, $\tau_i$ is the optimal delay of the amplitude of the i-th delay tap sampling point, and $d_i$ is the optimal embedding dimension of the amplitude of the i-th delay tap sampling point.

Preferably, a recurrence rate DET of the i-th delay tap sampling point is calculated from $$DET = \frac{\sum_{\ell=\ell_{min}}^{K_p \Sigma} \ell Q(\ell)}{\sum_{a,b=1}^{K_p} P_{a,b}},$$

where $Q(\ell)$ is the distribution probability with a length $\ell$ parallel to the diagonal in the threshold recurrence plot, $\ell_{min}$ is the diagonal with a minimum length $\ell_{min}$ in the threshold recurrence plot, and $K_p$ is the length of a sequence in the reconstructed phase space.

Preferably, the step of selecting the several delay taps with the recurrence rate magnitudes at front as the important delay taps according to the recurrence rate of each delay tap sampling point includes the following steps. The recurrence rate of each delay tap sampling point is sorted from large to small. Delay taps corresponding to $L_T$ largest recurrence rates are selected, where $L_T$ is the actual number of paths in a wireless channel.

According to another aspect of the disclosure, a system for selecting important delay taps of a channel impulse response is provided, which includes the following.

An amplitude calculation module is configured to obtain an amplitude of each delay tap sampling point according to the channel impulse response.

A delay and embedding dimension calculation module is configured to obtain an optimal delay and an optimal embedding dimension of the amplitude of each delay tap sampling point according to the amplitude of each delay tap sampling point.

A reconstructed phase space construction module is configured to obtain a reconstructed phase space of each delay tap sampling point based on the optimal delay and the optimal embedding dimension of the amplitude of each delay tap sampling point.

A selection threshold calculation module is configured to obtain a selection threshold of each delay tap sampling point according to the reconstructed phase space of each delay tap sampling point.

A recurrence plot construction module is configured to obtain a threshold recurrence plot of each delay tap sampling point based on the selection threshold of each delay tap sampling point.

A recurrence rate calculation module is configured to obtain a recurrence rate of each delay tap sampling point based on the threshold recurrence plot of each delay tap sampling point.

A delay tap selection module is configured to select several delay taps with the recurrence rate magnitudes at front as the important delay taps according to the recurrence rate of each delay tap sampling point.

Preferably, a selection threshold $\theta_i$ of an i-th delay tap sampling point is obtained from $\theta_i = \lambda \sigma_i$, where $\lambda$ is the threshold coefficient, and $\sigma_i$ is the standard deviation of an amplitude of the i-th delay tap sampling point.

Preferably, a threshold recurrence plot of the i-th delay tap sampling point is obtained from $P_{a,b} = \Psi(\theta_i - D_{a,b})$, where $\Psi$ is the step function, $D_{a,b}$ is the Euclidean distance between an a-th point $\xi_a$ and a b-th point $\xi_b$ in a reconstructed phase space of the i-th delay tap sampling point, $D_{a,b} = \|\xi_a - \xi_b\|$, where a, b=1, 2, 3, ..., $K_p$, $K_p = K - (d_i - 1)\tau_i$, where K is the total number of pilots, $\tau_i$ is the optimal delay of the amplitude of the i-th delay tap sampling point, and $d_i$ is the optimal embedding dimension of the amplitude of the i-th delay tap sampling point.

Preferably, a recurrence rate DET of the i-th delay tap sampling point is calculated from $$DET = \frac{\sum_{\ell=\ell_{min}}^{K_p \Sigma} \ell Q(\ell)}{\sum_{a,b=1}^{K_p} P_{a,b}},$$

where $Q(\ell)$ is the distribution probability with a length $\ell$ parallel to the diagonal in the threshold recurrence plot, $\ell_{min}$ is the diagonal with a minimum length $\ell_{min}$ in the threshold recurrence plot, and $K_p$ is the length of a sequence in the reconstructed phase space.

Preferably, the delay tap selection module is configured to sort the recurrence rate of each delay tap sampling point from large to small, and select delay taps corresponding to $L_T$ largest recurrence rates, where $L_T$ is the actual number of paths in a wireless channel.

According to another aspect of the disclosure, a computer-readable storage medium, stored with a program instruction, is provided. The method for selecting the important delay taps of the channel impulse response as described according to any one of the above is implemented when the program instruction is executed by a processor.

In general, compared with the prior art, the above technical solutions conceived by the disclosure can achieve the following beneficial effects:

The method for selecting the important delay taps in the channel impulse response according to the disclosure may distinguish the important delay taps from noise taps by using the local predictability of delay taps, which makes up for the defect that in wireless communication of the prior art, it is difficult to accurately select the important delay taps from the channel impulse response, thereby laying the foundation for future adaptive communication technologies, such as adaptive coding, adaptive modulation, and adaptive prediction.

DETAILED DESCRIPTION OF DISCLOSED EMBODIMENTS

In order for the objectives, technical solutions, and advantages of the disclosure to be more comprehensible, the disclosure is further described in detail below with reference to the accompanying drawings and embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

Figure 1:
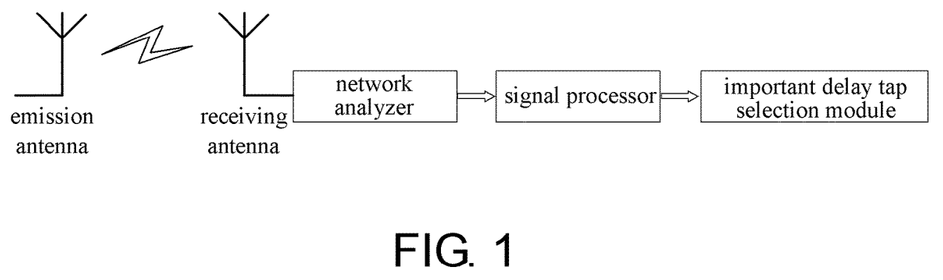
FIG. 1 is an equipment connection diagram according to an embodiment of the disclosure.

FIG. 1 shows the connection of a system for providing a channel impulse response according to an embodiment of the disclosure. The system includes the following.

An emission antenna is configured to emit a wireless signal.

A receiving antenna is configured to receive the wireless signals.

A network analyzer is configured to analyze the wireless signal obtained by the receiving antenna, and estimate a channel of a pilot symbol in an analysis result of the wireless signal.

A signal processor is configured to further obtain a channel impulse response.

An important delay tap selection module is configured to perform important delay tap detection on the obtained channel impulse response.

Figure 2:
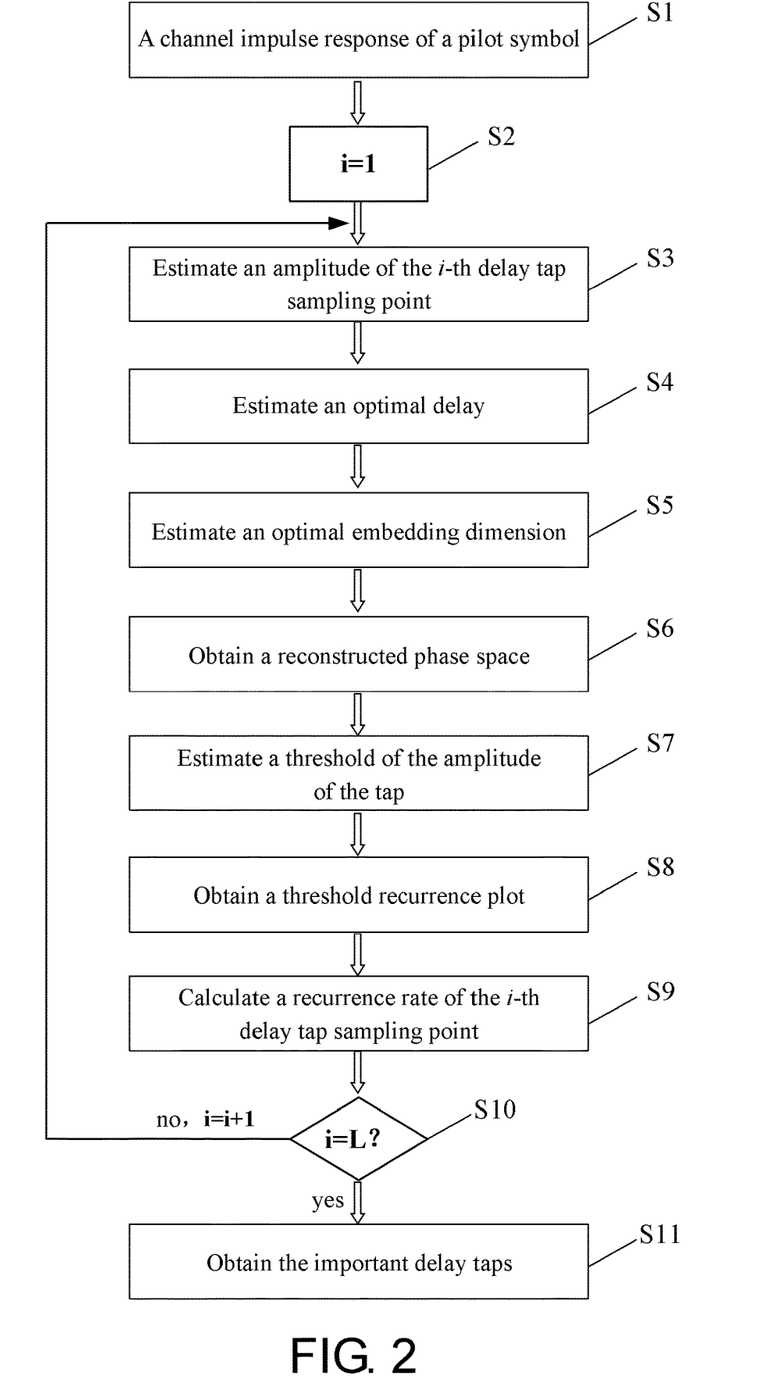
FIG. 2 is a schematic diagram of a flowchart of a method for selecting important delay taps of a channel impulse response according to an embodiment of the disclosure.

As shown in FIG. 2, a method for selecting important delay taps of a channel impulse response according to an embodiment of the disclosure includes the following steps.

Step S1: The obtained channel impulse response is assumed as $h \in \Re^{L \times K}$, (where K is the total number of pilots, and L is the total number of delay taps in the channel impulse response.

Step S2: A delay tap label i=1 is defined.

Step S3: An amplitude $|h_i| \in \Re^{1 \times K}$ of the i-th delay tap sampling point obtained from the channel pulse response in Step S1 is calculated to facilitate subsequent phase space reconstruction.

Step S4: In order to reconstruct a phase space of the amplitude of the i-th delay tap sampling point, a mutual information method needs to be used to estimate an optimal delay $\tau_i$ of the amplitude of the i-th delay tap sampling point.

Step S5: In order to reconstruct the phase space of the amplitude of the i-th delay tap sampling point, a false proximity method needs to be used to estimate an optimal embedding dimension $d_i$ of the amplitude of the i-th delay tap sampling point.

The mutual information method and the false proximity method are both methods in the prior art, which will not be reiterated in the embodiments of the disclosure.

Step S6: Based on the Takens' theorem, a reconstructed phase space $\hbar_i \in \Re^{K_p \times d_i}$ of the i-th delay tap sampling point may be obtained, where $K_p = K - (d_i - 1)\tau_i$. A recurrence rate of the reconstructed phase space may be further used to indirectly evaluate a local predictability of the i-th delay tap sampling point.

Step S7: A selection threshold $\theta_i$ of the i-th delay tap sampling point is obtained.

Since the threshold affects subsequent calculation of a recurrence rate index, the threshold is an important parameter in the disclosure. The threshold is generally related to the standard deviation of a given sequence. Assuming that the standard deviation of the amplitude of the i-th delay tap sampling point is $\sigma_i$, the selection threshold of the i-th delay tap sampling point is:

$$\theta_i = \lambda \sigma_i \quad (1)$$

where $\lambda$ is the threshold coefficient, and the value is [1, 1, 5].

Step S8: A threshold recurrence plot of the i-th delay tap sampling point is obtained. The calculation formula of the threshold recurrence plot is:

$$P_{a,b} = \Psi(\theta_i - D_{a,b}) \quad (2)$$

where $\Psi$ is the step function, and P is the intermediate variable. $D_{a,b}$ is the Euclidean distance between an a-th point $\xi_a$ and a b-th point $\xi_b$ in the reconstructed phase space, that is:

$$D_{a,b} = \|\xi_a - \xi_b\| \quad (3)$$

where a, b=1, 2, 3, . . . , $K_p$.

Step S9: A recurrence rate of the i-th delay tap sampling point is calculated. The calculation formula of a recurrence rate DET is:

$$DET = \frac{\sum_{\ell=\ell_{min}}^{K_p} \ell Q(\ell)}{\sum_{a,b=1}^{K_p} P_{a,b}}, \quad (4)$$

where $Q(\ell)$ is the distribution probability with a length $\ell$ parallel to the diagonal in the threshold recurrence plot, $\ell_{min}$ is the diagonal with a minimum length $\ell_{min}$ in the threshold recurrence plot, and $K_p$ is the length of a sequence in the reconstructed phase space.

Step S10: Whether i is equal to a largest delay tap number L is judged. If not, i=i+1, and return to Step S3.

Step S11: According to the recurrence rate DET, the important delay taps are selected.

In the embodiment of the disclosure, the recurrence rate DET is an indirect evaluation of the local predictability of delay taps. Therefore, the method for selecting the important delay taps according to the recurrence rate DET is to select several delay taps with the largest recurrence rates DET. That is, the recurrence rates DET are sorted from largest to smallest, and the delay taps corresponding to $L_T$ largest recurrence rates DET are selected, where $L_T$ is the actual number of paths in a wireless channel. The remaining taps in the channel impulse response are regarded as pure noise taps, that is, unimportant delay taps.

In order to verify the effectiveness of the disclosure, relevant parameters of the pilot orthogonal frequency division multiplexing (OFDM) symbol are set according to the 2 MHz mode in the IEEE802.11ah standard, and a single-transmit single-receive antenna is set. Table 1 shows the comparison result of the disclosure and two other different types of methods for selecting important taps under 20 dB.

TABLE 1

| Method | Selected delay tap |
|---|---|
| Method 1 | 1-16 |
| Method 2 | 1, 2, 4, 5, 6, 10, 12, 13, 14, and 16 |
| Disclosure | 1, 5, 10, 13, and 16 |

Figure 3:
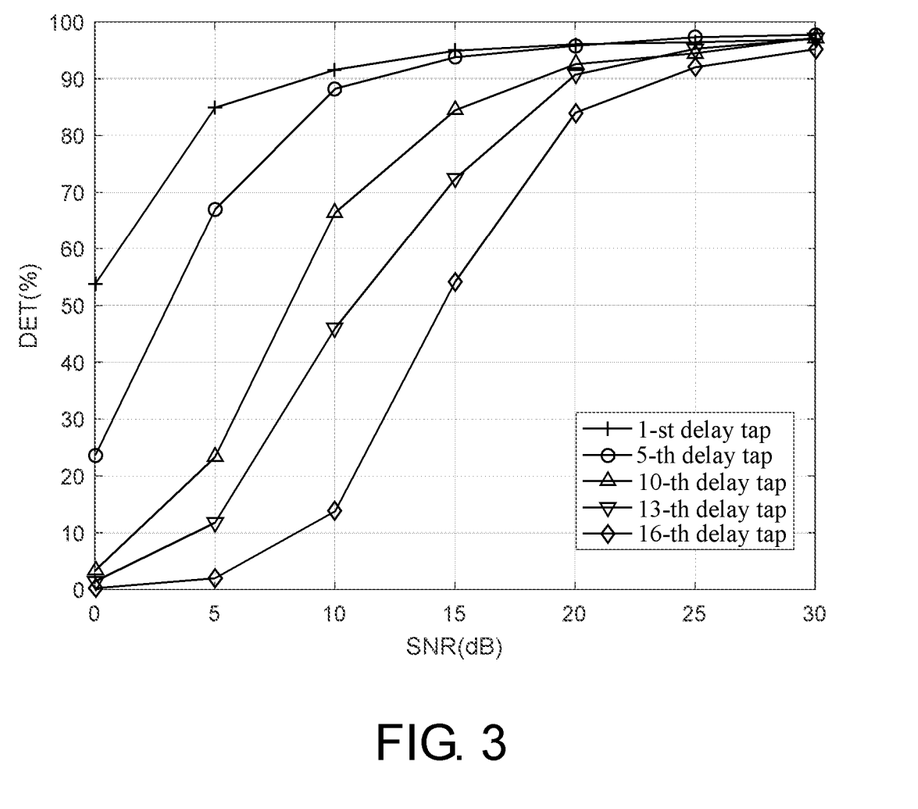
FIG. 3 is a detection error tradeoff (DET) curve of important delay taps under different signal-to-noise ratios of an orthogonal frequency division multiplexing (OFDM) communication system according to an embodiment of the disclosure.

Method 1 is the method of selecting $L_{cp}$ important delay taps, where $L_{cp}$ is the length of a cyclic prefix. Method 2 is the method of selecting $L_s$ important delay taps, where $L_s$ is twice of $L_T$. FIG. 3 shows the curves of 5 preset important delay taps under different signal-to-noise ratios. It can be seen that the method for selecting the important delay taps according to the disclosure has better performance and may effectively identify the important delay taps in the channel impulse response.

Figure 4:
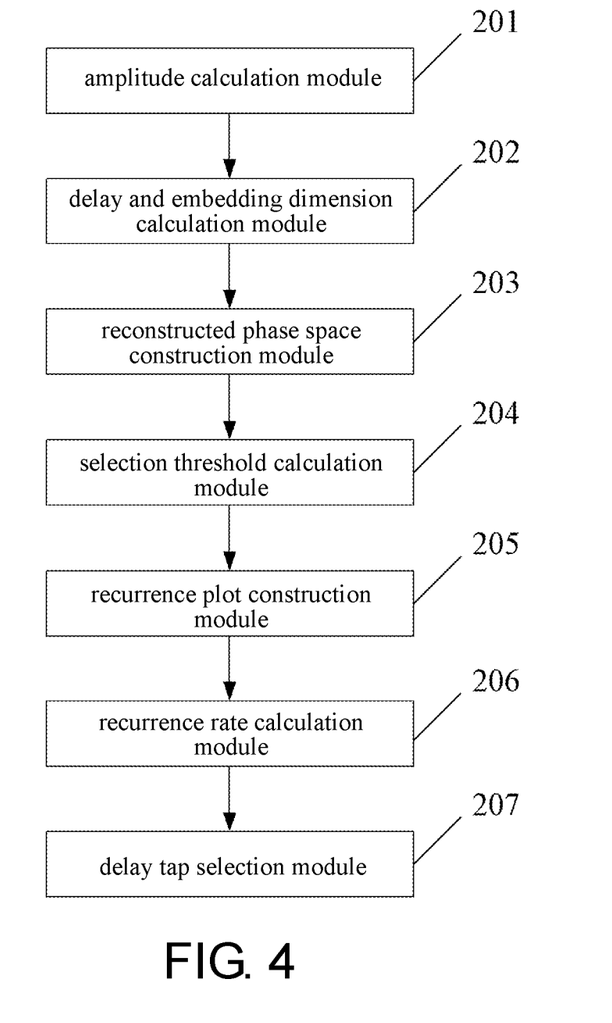
FIG. 4 is a schematic diagram of a structure of a system for selecting important delay taps of a channel impulse response according to an embodiment of the disclosure.

As shown in FIG. 4, in another embodiment of the disclosure, a system for selecting important delay taps of a channel impulse response is also provided, which includes the following.

An amplitude calculation module 201 is configured to obtain an amplitude of each delay tap sampling point according to the channel impulse response.

A delay and embedding dimension calculation module 202 is configured to obtain an optimal delay and an optimal embedding dimension of the amplitude of each delay tap sampling point according to the amplitude of each delay tap sampling point.

A reconstructed phase space construction module 203 is configured to obtain a reconstructed phase space of each delay tap sampling point based on the optimal delay and the optimal embedding dimension of the amplitude of each delay tap sampling point.

A selection threshold calculation module 204 is configured to obtain a selection threshold of each delay tap sampling point according to the reconstructed phase space of each delay tap sampling point.

A recurrence plot construction module 205 is configured to obtain a threshold recurrence plot of each delay tap sampling point based on the selection threshold of each delay tap sampling point.

A recurrence rate calculation module 206 is configured to obtain a recurrence rate of each delay tap sampling point based on the threshold recurrence plot of each delay tap sampling point.

A delay tap selection module 207 is configured to select several delay taps with the recurrence rate magnitudes at front as the important delay taps according to the recurrence rate of each delay tap sampling point.

For the specific implementation of each module, reference may be made to the description of the foregoing embodiment for the method, which will not be reiterated in the embodiment of the disclosure.

In another embodiment of the disclosure, a computer-readable storage medium, stored with a program instruction, is also provided. The method for selecting the important delay taps of the channel impulse response as described above is implemented when the program instruction is executed by a processor.

It should be pointed out that according to implementation requirements, each step/component described in the disclosure may be split into more steps/components, or two or more steps/components or partial operations of steps/components may be combined into a new step/component to implement the objective of the disclosure.

The above method according to the disclosure may be implemented in hardware and firmware, implemented as software or computer codes that may be stored in a recording medium (such as compact disc read-only memory (CD ROM), random access memory (RAM), floppy disk, hard disk, or magneto-optical disk), or implemented as computer codes that are originally stored in a remote recording medium or a non-transitory machine-readable medium downloaded through the network and will be stored in a local recording medium, so that the method may be processed by such software stored on a recording medium using a general-purpose computer, a special-purpose processor, or a programmable or special-purpose hardware (such as application specific integrated circuit (ASIC) or field programmable gate array (FPGA)). It can be understood that a computer, a processor, a microprocessor, a controller, or a programmable hardware includes a storage component (for example, RAM, ROM, flash memory, etc.) that may store or receive the software or computer codes. When the software or computer codes are accessed and executed by a computer, a processor, or hardware, the processing method is implemented. Furthermore, when a general-purpose computer accesses codes for implementing the processing, the execution of the codes converts a general-purpose computer into a special-purpose computer for executing the processing.

Persons skilled in the art may easily understand that the above descriptions are only preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A method for selecting important delay taps of channel impulse response, comprising:
    obtaining an amplitude of each delay tap sampling point according to a channel impulse response;
    obtaining an optimal delay and an optimal embedding dimension of the amplitude of each delay tap sampling point according to the amplitude of each delay tap sampling point;
    obtaining a reconstructed phase space of each delay tap sampling point based on the optimal delay and the optimal embedding dimension of the amplitude of each delay tap sampling point;
    obtaining a selection threshold of each delay tap sampling point according to the reconstructed phase space of each delay tap sampling point;
    obtaining a threshold recurrence plot of each delay tap sampling point based on the selection threshold of each delay tap sampling point;
    obtaining a recurrence rate of each delay tap sampling point based on the threshold recurrence plot of each delay tap sampling point; and
    selecting a plurality of delay taps with recurrence rate magnitudes at front as the important delay taps according to the recurrence rate of each delay tap sampling point.

2. The method according to claim 1, wherein a selection threshold $\theta_i$ of an i-th delay tap sampling point is obtained from $\theta_i = \lambda \sigma_i$, where $\lambda$ is a threshold coefficient, and $\sigma_i$ is a standard deviation of an amplitude of the i-th delay tap sampling point.

3. The method according to claim 2, wherein a threshold recurrence plot of the i-th delay tap sampling point is obtained from $P_{a,b} = \Psi(\theta_i - D_{a,b})$, where $\Psi$ is a step function, $D_{a,b}$ is an Euclidean distance between an a-th point $\xi_a$ and a b-th point $\xi_b$ in a reconstructed phase space of the i-th delay tap sampling point, $D_{a,b} = |\xi_a - \xi_b|$, where a, b = 1, 2, 3, ..., $K_p$, $K_p = K - (d_i - 1)\tau_i$, where K is a total number of pilots, $\tau_i$ is an optimal delay of the amplitude of the i-th delay tap sampling point, and $d_i$ is an optimal embedding dimension of the amplitude of the i-th delay tap sampling point.

4. The method according to claim 3, wherein a recurrence rate DET of the i-th delay tap sampling point is calculated from $$DET = \frac{\sum\limits_{\ell=\ell_{min}}^{K_p} \ell Q(\ell)}{\sum\limits_{a,b=1}^{K_p} P_{a,b}},$$

where $Q(\ell)$ is a distribution probability with a length $\ell$ parallel to a diagonal in the threshold recurrence plot, $\ell_{min}$ is a diagonal with a minimum length $\ell_{min}$ in the threshold recurrence plot, and $K_p$ is a length of a sequence in the reconstructed phase space.

5. The method according to claim 1, wherein the step of selecting the plurality of delay taps with the recurrence rate magnitudes at front as the important delay taps according to the recurrence rate of each delay tap sampling point comprises:
    sorting the recurrence rate of each delay tap sampling point from large to small, and selecting delay taps corresponding to $L_T$ largest recurrence rates, where $L_T$ is an actual number of paths in a wireless channel.

6. The method according to claim 2, wherein the step of selecting the plurality of delay taps with the recurrence rate magnitudes at front as the important delay taps according to the recurrence rate of each delay tap sampling point comprises:
    sorting the recurrence rate of each delay tap sampling point from large to small, and selecting delay taps corresponding to $L_T$ largest recurrence rates, where $L_T$ is an actual number of paths in a wireless channel.

7. The method according to claim 3, wherein the step of selecting the plurality of delay taps with the recurrence rate magnitudes at front as the important delay taps according to the recurrence rate of each delay tap sampling point comprises:
    sorting the recurrence rate of each delay tap sampling point from large to small, and selecting delay taps corresponding to $L_T$ largest recurrence rates, where $L_T$ is an actual number of paths in a wireless channel.

8. The method according to claim 4, wherein the step of selecting the plurality of delay taps with the recurrence rate magnitudes at front as the important delay taps according to the recurrence rate of each delay tap sampling point comprises:
    sorting the recurrence rate of each delay tap sampling point from large to small, and selecting delay taps corresponding to $L_T$ largest recurrence rates, where $L_T$ is an actual number of paths in a wireless channel.

9. A system for selecting important delay taps of channel impulse response, comprising:
    an amplitude calculation module, configured to obtain an amplitude of each delay tap sampling point according to a channel impulse response;
    a delay and embedding dimension calculation module, configured to obtain an optimal delay and an optimal embedding dimension of the amplitude of each delay tap sampling point according to the amplitude of each delay tap sampling point;

a reconstructed phase space construction module, configured to obtain a reconstructed phase space of each delay tap sampling point based on the optimal delay and the optimal embedding dimension of the amplitude of each delay tap sampling point;

a selection threshold calculation module, configured to obtain a selection threshold of each delay tap sampling point according to the reconstructed phase space of each delay tap sampling point;

a recurrence plot construction module, configured to obtain a threshold recurrence plot of each delay tap sampling point based on the selection threshold of each delay tap sampling point;

a recurrence rate calculation module, configured to obtain a recurrence rate of each delay tap sampling point based on the threshold recurrence plot of each delay tap sampling point; and a delay tap selection module, configured to select a plurality of delay taps with recurrence rate magnitudes at front as the important delay taps according to the recurrence rate of each delay tap sampling point.

10. The system according to claim 9, a selection threshold $\theta_i$ of an i-th delay tap sampling point is obtained from $\theta_i = \lambda \sigma_i$, where $\lambda$ is a threshold coefficient, and $\sigma_i$ is a standard deviation of an amplitude of the i-th delay tap sampling point.

11. The system according to claim 10, wherein a threshold recurrence plot of the i-th delay tap sampling point is obtained from $P_{a,b} = \Psi(\theta_i - D_{a,b})$ where $\Psi$ is a step function, $D_{a,b}$ is an Euclidean distance between an a-th point $\xi_a$ and a b-th point $\xi_b$ in a reconstructed phase space of the i-th delay tap sampling point, $D_{a,b} = \|\xi_a - \xi_b\|$, where a, b=1, 2, 3, ..., $K_p$, $K_p = K - (d_i - 1)\tau_i$, where K is a total number of pilots, $\tau_i$ is an optimal delay of the amplitude of the i-th delay tap sampling point, and $d_i$ is an optimal embedding dimension of the amplitude of the i-th delay tap sampling point.

12. The system according to claim 11, wherein a recurrence rate DET of the i-th delay tap sampling point is calculated from $$DET = \frac{\sum_{\ell=\ell_{min}}^{K_p\Sigma} \ell Q(\ell)}{\sum_{a,b=1}^{K_p} P_{a,b}},$$

where $Q(\ell)$ is a distribution probability with a length $\ell$ parallel to a diagonal in the threshold recurrence plot, $\ell_{min}$ is a diagonal with a minimum length $\ell_{min}$ in the threshold recurrence plot, and $K_p$ is a length of a sequence in the reconstructed phase space.

13. The system according to claim 9, wherein the delay tap selection module is configured to sort the recurrence rate of each delay tap sampling point from large to small, and select delay taps corresponding to $L_T$ largest recurrence rates, where $L_T$ is an actual number of paths in a wireless channel.

14. The system according to claim 10, wherein the delay tap selection module is configured to sort the recurrence rate of each delay tap sampling point from large to small, and select delay taps corresponding to $L_T$ largest recurrence rates, where $L_T$ is an actual number of paths in a wireless channel.

15. The system according to claim 11, wherein the delay tap selection module is configured to sort the recurrence rate of each delay tap sampling point from large to small, and select delay taps corresponding to $L_T$ largest recurrence rates, where $L_T$ is an actual number of paths in a wireless channel.

16. The system according to claim 12, wherein the delay tap selection module is configured to sort the recurrence rate of each delay tap sampling point from large to small, and select delay taps corresponding to $L_T$ largest recurrence rates, where $L_T$ is an actual number of paths in a wireless channel.

* * * * *

UNITED STATES PATENT AND TRADEMARK OFFICE
CERTIFICATE OF CORRECTION

PATENT NO. : 11,310,083 B2  
APPLICATION NO. : 17/163581  
DATED : April 19, 2022  
INVENTOR(S) : Yigang He et al.

Page 1 of 1

It is certified that error appears in the above-identified patent and that said Letters Patent is hereby corrected as shown below:

On the Title Page

Item (73) should read, -- WUHAN UNIVERSITY, HUBEI (CN) --

Signed and Sealed this  
Twenty-eighth Day of February, 2023

Katherine Kelly Vidal  
*Director of the United States Patent and Trademark Office*